United States Patent
Rubin

(10) Patent No.: US 8,992,008 B2
(45) Date of Patent: Mar. 31, 2015

(54) FOLDABLE EYEWEAR

(71) Applicant: Wayne Rubin, Hewlett Bay Park, NY (U\S)

(72) Inventor: Wayne Rubin, Hewlett Bay Park, NY (US)

(*) Notice: Subject to any disclaimer, the term of this patent is extended or adjusted under 35 U.S.C. 154(b) by 0 days.

(21) Appl. No.: 13/786,961

(22) Filed: Mar. 6, 2013

(65) Prior Publication Data
US 2013/0235324 A1    Sep. 12, 2013

Related U.S. Application Data

(60) Provisional application No. 61/607,326, filed on Mar. 6, 2012, provisional application No. 61/675,130, filed on Jul. 24, 2012.

(51) Int. Cl.
| | |
|---|---|
| G02C 5/08 | (2006.01) |
| G02C 5/00 | (2006.01) |
| G02C 5/20 | (2006.01) |
| G02C 5/22 | (2006.01) |
| G02C 5/12 | (2006.01) |

(52) U.S. Cl.
CPC *G02C 5/006* (2013.01); *G02C 5/20* (2013.01); *G02C 5/22* (2013.01); *G02C 5/08* (2013.01); *G02C 5/12* (2013.01); G02C 2200/02 (2013.01)
USPC .............................................. 351/63

(58) Field of Classification Search
CPC ............ G02C 5/006; G02C 5/08; G02C 5/14; G02C 5/143; G02C 2200/02
USPC .............................................. 351/63
See application file for complete search history.

(56) References Cited

U.S. PATENT DOCUMENTS

| | | | |
|---|---|---|---|
| 5,768,716 A * | 6/1998 | Porsche | 2/454 |
| 6,783,236 B2 * | 8/2004 | Chou | 351/63 |
| 2009/0190088 A1 * | 7/2009 | Strobel | 351/63 |

FOREIGN PATENT DOCUMENTS

GB    2 433 328    *  6/2007 .................. 351/63

* cited by examiner

*Primary Examiner* — Huy K Mai
(74) *Attorney, Agent, or Firm* — F. Chau & Associates, LLC

(57) ABSTRACT

Eyewear is provided. The eyewear includes a left unit and a right unit coupled with the left unit through a first hinge structure. The left unit or the right unit includes a lens rim and a temple coupled with a side of the lens rim through a second hinge structure. The temple has a first temple part and a second temple part coupled with each other via a third hinge structure. The first temple part and the second temple part of the temple are shaped and sized to form an enclosure for at least partially or alternatively fully enclosing the lens rim and or lens when the second temple part is folded against the first temple part.

17 Claims, 5 Drawing Sheets

FOLDABLE EYEWEAR

CROSS-REFERENCE TO RELATED APPLICATION

This non-provisional application claims priority to U.S. Provisional Application No. 61/607,326, filed on Mar. 6, 2012 and U. S. Provisional Application No. 61/675,130, filed on Jul. 24, 2012, both disclosures of which are incorporated by reference herein.

TECHNICAL FIELD

Embodiments of the present invention are directed toward eyewear and particularly to foldable eyewear.

DISCUSSION OF THE RELATED ART

Many limitations currently exist with traditional eyewear regarding their ease of transport, protection of optical surfaces, and when space limitations preclude their ready availability for use. Folding eyewear in their present designs and construction are not designed to preclude the requirement of a separate carrying case to protect optical surfaces with currently sold folding eyewear products. Insofar as the inconvenience of utilizing a separate carrying case or other storage device often results in them not being used, inevitably the optical surfaces of many folding glasses are exposed to damage.

Additionally, present product offering designs and structures do not allow for complete closure of the eyewear's arms to fully protect the folding eyewear's lens or allow the integrity of the eyewear in its folded orientation to secure the lenses and/or the optical surfaces of the lenses from breakage, scratch or other damages, or safeguarding the optical correction attributes of the lenses from diminution or distortion due to damage and debris aggregation. With present designs and structures there is also typically no inclusion of nose guard pieces as is common with standard non-folding eyewear nor do they allow for formation of a complete enclosure utilizing the folding eyewear's arms to encapsulate the lenses for optimal protection and structural strength when folded.

SUMMARY

Embodiments of the present invention provide foldable eyewear that can provide increased portability safety and convenience of deployment without requiring a separate case or storage device, together with greatly augmented protection of the lenses and optical surfaces.

According to an embodiment of the present invention, eyewear is provided. The eyewear includes a left unit and a right unit coupled with the left unit through a first hinge structure. The left unit or the right unit includes a lens rim and a temple coupled with a side of the lens rim through a second hinge structure. The temple has a first temple part and a second temple part coupled with each other via a third hinge structure. The first temple part and the second temple part of the temple are shaped and sized to form an enclosure for at least partially housing the lens rim when the second temple part is folded against the first temple part.

The temple forms a curvature when left unfolded.

The second temple part of the temple includes a tapering front part and a temple end connected to the tapering front part.

Each of the left unit and the right unit further includes a nose guard piece on a side of the lens rim. The nose guard piece of the left unit and the nose guard piece together form a nose guard when the rims are left unfolded.

The nose guard is encapsulated in the enclosure when the eyewear is left in a folded position.

The eyewear further includes a bridge connecting the lens rim of the left unit with the lens rim of the right unit. The bridge includes a first bridge part extended from the lens rim of the left unit and a second bridge part extended from the lens rim of the right unit.

The first bridge part is coupled with the second bridge part via the first hinge structure.

The first bridge part and the second bridge part include opposite-polarity magnets, respectively.

The first hinge structure includes two hinges.

The first temple part of the temple includes a first magnet at a rear side thereof, and the second temple part of the temple includes a second magnet at a front side thereof. The first magnet and the second magnet have opposite polarities. The first magnet is positioned to couple to the second magnet when the temple is left unfolded.

The first temple part of the temple includes a first magnet at a front side thereof, and the second temple part of the temple includes a second magnet at a rear side thereof. The first magnet and the second magnet have opposite polarities. The first magnet is positioned to couple to the second magnet when the temple is left folded.

The third hinge structure includes two hinges.

A vertical width of the temple when the temple is left folded is substantially the same as a vertical width of the lens rim as viewed in a side view.

BRIEF DESCRIPTION OF THE DRAWINGS

The embodiments of the present invention will become readily apparent by reference to the following detailed description when considered in conjunction with the accompanying drawings wherein.

DESCRIPTION OF THE EXEMPLARY EMBODIMENTS

Figure 1:
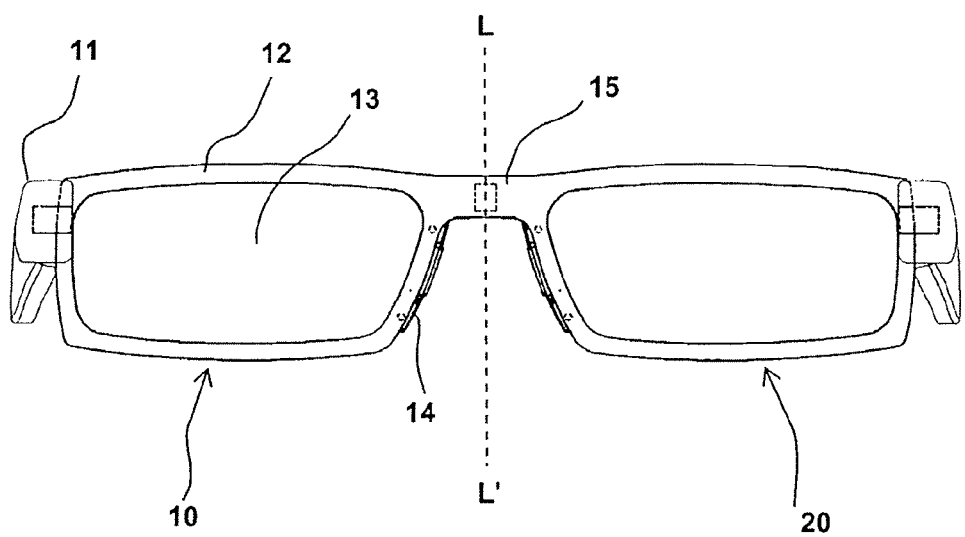
FIG. 1 is a front view illustrating foldable eyewear when left in an unfolded position according to an embodiment of the present invention.
Figure 1:
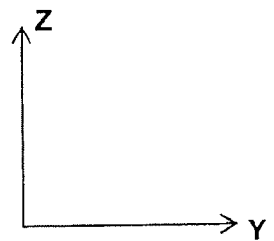

Hereinafter, exemplary embodiments of the present invention will be described in detail with reference to the accompanying drawings, wherein the same reference characters or numerals may be used to denote the same or substantially the same elements throughout the specification and the drawings.

It will be understood that when an element or layer is referred to as being "on", "connected to"or "coupled to" another element or layer, it can be directly on, connected or coupled to the other element or layer or intervening elements or layers may be present. Like numbers may refer to like elements throughout the drawings and the specification.

Figure 2:
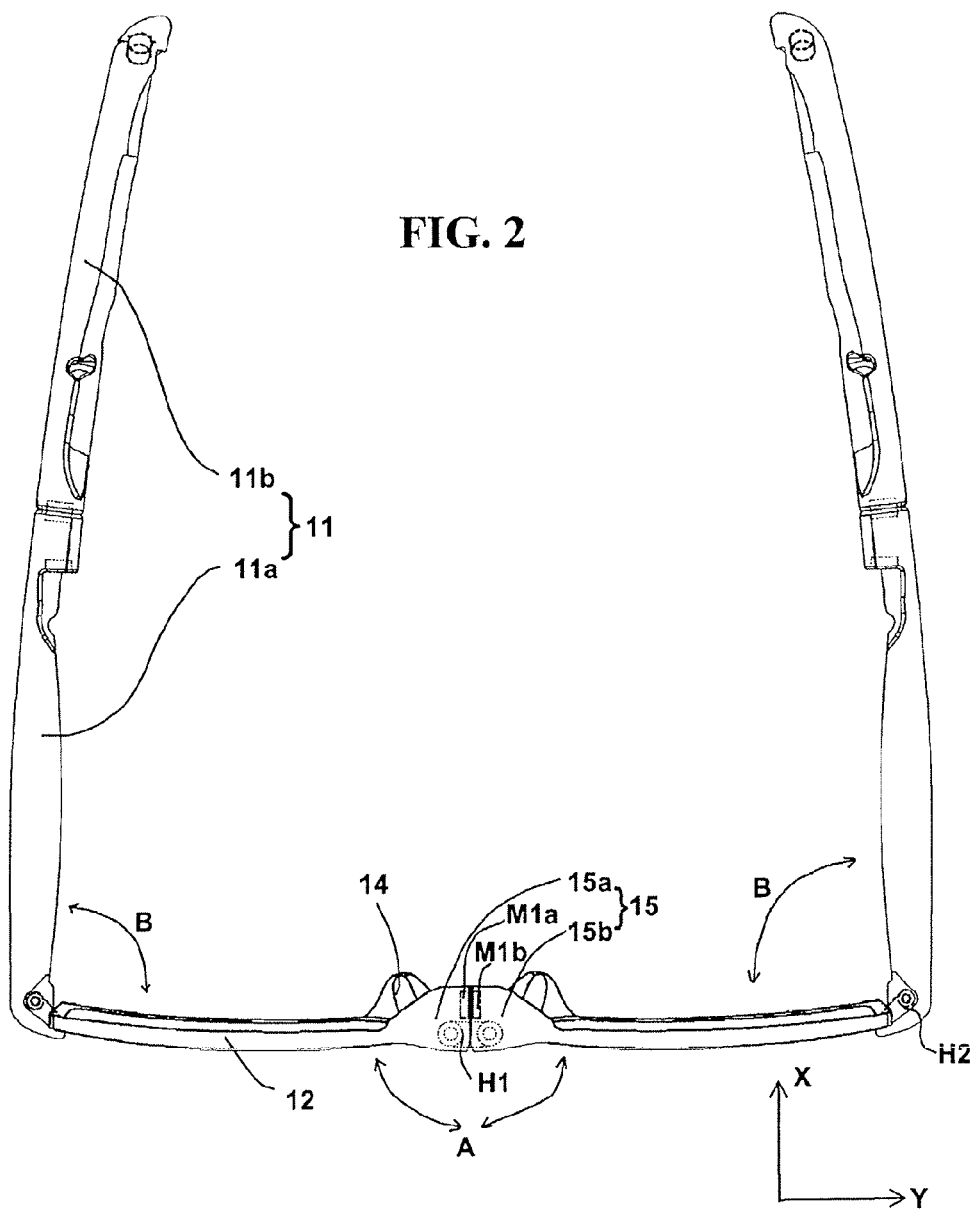
FIG. 2 is a top view of the foldable eyewear of FIG. 1.
Figure 3:
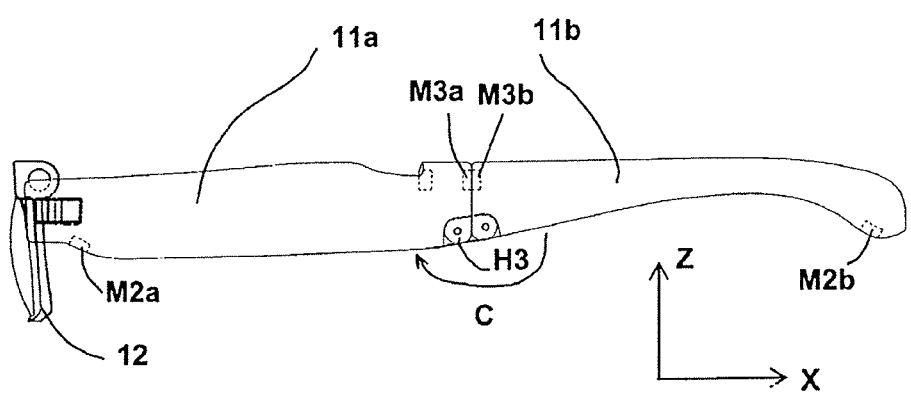
FIG. 3 is a left side view of the foldable eyewear of FIG. 1.
Figure 4:
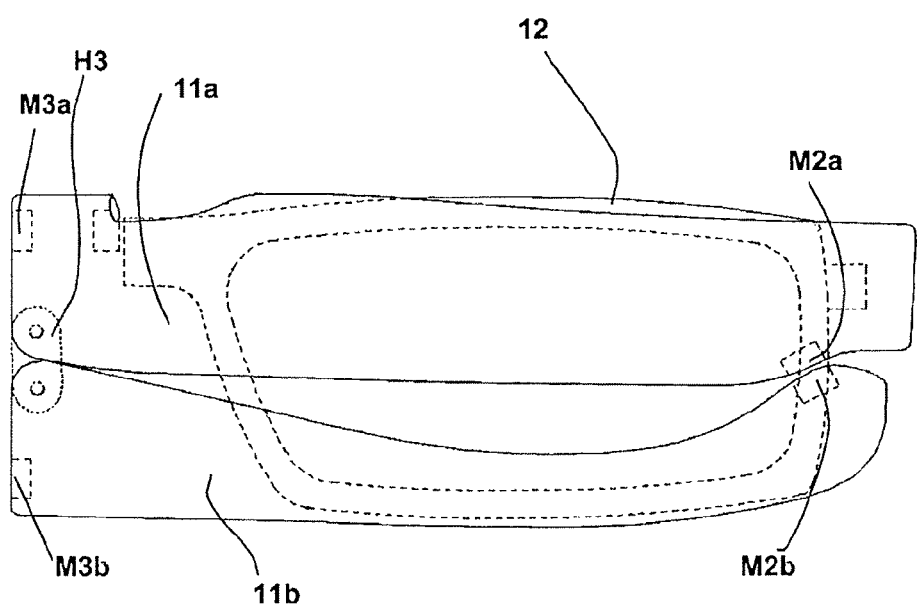
FIG. 4 is a right side view of the foldable eyewear of FIG. 1 when the foldable eyewear is left in a folded position.
Figure 5:
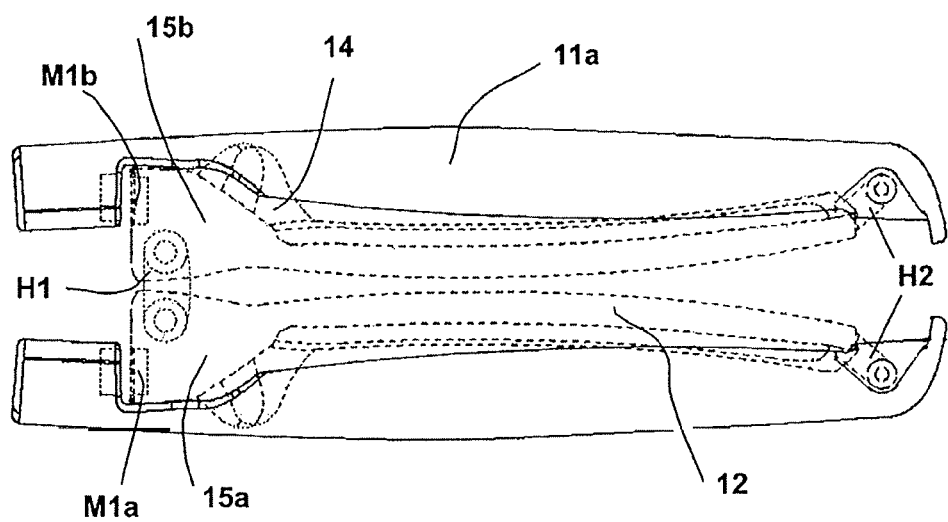
FIG. 5 is a top view of the foldable eyewear of FIG. 1 when the foldable eyewear is left in a folded position.

FIG. 1 is a front view illustrating foldable eyewear when left in an unfolded position according to an embodiment of the present invention. FIG. 2 is a top view of the foldable eyewear of FIG. 1. FIG. 3 is a left side view of the foldable eyewear of FIG. 1. FIG. 4 is a right side view of the foldable eyewear of FIG. 1 when the foldable eyewear is left in a folded position. FIG. 5 is a top view of the foldable eyewear of FIG. 1 when the foldable eyewear is left in a folded position.

Referring to FIGS. 1 and 2, the eyewear according to an embodiment of the present invention includes a right unit 10 and a left unit 20. The right unit 10 is substantially symmetrical to the left unit 20 with respect to a virtual line L-L'. The right unit 10 and the left unit 20 may be coupled with each other through a hinge structure H1. The right unit 10 and the left unit 20 may be folded toward each other about hinge H1 in a direction marked with arrows A in FIG. 2.

Hereinafter, the description primarily focuses on the right unit 10 for ease of description, but it may be understood by one of ordinary skilled in the art that the same or substantially the same description may apply to the left unit 20 as well.

The right unit 10 includes a temple 11, a lens rim 12, a lens 13, and a nose guard piece 14. The temple 11 is coupled with the lens rim 12 to be folded in a direction toward the lens rim 12 or to be unfolded in a direction away from the lens rim 12. The temple 11 may be coupled with the lens rim 12 via a hinge structure H2. The temple 11 and the lens rim 12 may be folded toward each other about hinge H2 in a direction marked with arrows B in FIG. 2.

The temple 11 will be described below in greater detail.

The lens rim 12 surrounds the lens 13 along the edge of the lens 13.

The lens rims 12 of the right unit 10 and the left unit 20 are coupled with each other through a bridge 15. The bridge 15 includes a bridge part 15a extended from the right lens rim 12 and a bridge part 15b extended from the left lens rim 12. The bridge 15 may extend rearward, e.g., in an X-axis direction of FIG. 2. The bridge parts 15a and 15b of the right unit 10 and the left unit 20 are coupled with each other via the hinge structure H1.

Referring to FIG. 2, the hinge structure H1 of the bridge 15 may include a pair of hinges that are adjacent to each other and together form a coupling structure for the bridge parts 15a and 15b of the left and right lens rims 12. Thus, the left and right lens rims 12 may be folded toward each other in a direction denoted with an arrow as shown in FIG. 2.

Although it is described above that two hinges are used for coupling between the left and right lens rims 12, the embodiments of the present invention are not limited thereto. Alternatively, the left and right lens rims 12 may be coupled with each other via a single hinge.

The bridge parts 15a and 15b may include their respective magnet pieces M1a and M1b, for example, behind the hinges as shown in FIG. 2. The magnet pieces M1a and M1b of the bridge parts 15a and 15b may respectively have opposite polarities (N and S or S and N) and may be thus attached to each other when the bridge parts 15a and 15b are unfolded as illustrated in FIG. 2. Accordingly, the magnet pieces M1a and M1b of the bridge parts 15a and 15b may leave the bridge parts 15a and 15b in a secure unfolded position.

Although it is described above that opposite-polarity magnet pieces M1a and M1b are used for maintaining an unfolded position of the lens rims 12, the embodiments of the present invention are not limited thereto. For example, one of the magnet pieces M1a and M1b of the bridge parts 15a and 15b may be replaced with a magnet-coupling metal while the other is left as a magnet).

According to embodiments of the present invention, the magnet pieces M1a and M1b of the bridge parts 15a and 15b may be attached to outer surfaces of the bridge parts 15a and 15b or may be invisibly embedded in the bridge parts 15a and 15b. Alternatively, the magnet pieces M1a and M1b may be magnetized portions of the bridge parts 15a and 15b but rather than being provided as separate members.

The nose guard piece 14 is positioned at a portion of the lens rim 12 which is located opposite to a portion of the lens rim 12 which is coupled with the temple 11.

The nose guard piece 14 of the right unit 10 and the nose guard piece 14 of the left unit 20 make a pair to thus form a full nose guard to support the eyewear on a wearer's nose. The nose guard piece 14 may be attached, as a separate member, to the portion of the lens rim 12 or may be integrally formed with the lens rim 12.

Although according to one embodiment the eyewear includes the lens rims 12 to fully surround the lenses 13, the embodiments of the present invention are not limited thereto. Alternatively, the lens rims 12 may be omitted or may be provided to partially surround the lenses 13. In other words, the eyewear may have a frameless or partial-frame structure. In such case, the hinge structure H2 used for coupling the temple 11 with the lens rims 12 and the hinge structure H1 for coupling the bridge parts 15a and 15b may be directly attached to the lenses 13. Further, the nose guard pieces 14 may also be attached directly to the lenses 13.

The temple 11 is now described in more detail.

As shown in FIG. 2, the temple 11 may be formed to have a curvature when viewed in a top view. For example, the temples 11 of the right unit 10 and the left unit 20 may be curved toward each other as if the temples 11 hold or surround a wearer's head. This curvature of the temple 11 allows for more secure holding of his/her head while providing him/her with more contact surfaces between the eyewear and the head such that wearing durations and comfort levels exceed or at least conform to industry standard consumer expectations.

The temple 11 includes a first temple part 11a and a second temple part 11b. The first temple part 11a is coupled with the lens rim 12 via the hinge structure H2, and the second temple part 11b is coupled with the first temple part 11a via a hinge structure H3.

The first temple part 11a or the second temple part 11b may be folded to the lens rim 12 about hinge H2, in a direction marked with an arrow B in FIG.

As shown in FIG. 3, the hinge structure H3 through which the first temple part 11a is coupled with the second temple part 11b may include a pair of hinges, one of which is positioned at a rear and lower side of the first temple part 11a, and the other of the hinges is positioned at a front and lower side of the second temple part 11b.

The hinge of the first temple part 11a and the hinge of the second temple part 11b, together, form a coupling structure for the first temple part 11a and the second temple part 11b, so that the second temple part 11b may be folded to the first temple part 11a about hinge H3, in a direction marked with an arrow "C" as illustrated in FIG. 3 to change from a temple that extended in the X direction to a near rectangular shape, with the first temple part 11a on top of the second temple part 11b. Although it is described above that two hinges are used for coupling between the first temple part 11a and the second temple part 11b, the embodiments of the present invention are not limited thereto. Alternatively, the first temple part 11a and the second temple part 11b may be coupled with each other via a single hinge.

Although it is illustrated in FIG. 2 that a single hinge is used for coupling between the lens rim 12 and the first temple part 11a, the embodiments of the present invention are not limited thereto. Alternatively, the same or substantially the same hinge structure as used between the lens rims 12 or between the first temple part 11a and the second temple part 11b may be also used for coupling the lens rim 12 and the first temple part 11a.

The first temple part 11a includes magnet pieces M2a and M1a, one of which is positioned at a front and lower side while another one is positioned at a rear and upper side. For example, the first temple part 11a includes a first magnet piece M2a at a front and lower side thereof and a second magnet piece M3a at a rear and upper side thereof.

The second temple part 11b also includes magnet pieces M3b and M2b, one of which is positioned at a front and upper side while another one is positioned at a rear and lower side. For example, the second temple part 11b includes a first magnet piece M3b at a front and upper side thereof and a second magnet piece M2b at a rear and lower side thereof.

The first magnet piece M2a of the first temple part 11a and the second magnet piece M2b of the second temple part 11b have opposite polarities (N and S or S and N), and may be thus attached to each other when the second temple part 11b is left folded with the first temple part 11a. As such, the magnet pieces M2a and M2b of the first temple part 11a and the second temple part 11b may maintain a secure folded position of the first temple part 11a and the second temple part 11b.

The second magnet piece M3a of the first temple part 11a and the first magnet piece M3b of the second temple part 11b have opposite polarities (N and S or S and N), and may be thus attached to each other when the second temple part 11b is left unfolded against the first temple part 11a. As such, the magnet pieces M3a and M3b of the first temple part 11a and the second temple part 11b may maintain a secure unfolded position of the first temple part 11a and the second temple part 11b.

Although it is described above that opposite-polarity magnet pieces are used for maintaining a folded or unfolded position of the temple 11, the embodiments of the present invention are not limited thereto. For example, the first and second magnet pieces M2a and M3a or M3b and M2b of the first temple part 11a or the second temple part 11b may be replaced with a metal piece that may be magnetically coupled to a magnet while their respective corresponding parts of the counterpart temple part 11b or 11 a are formed of a magnet. One of the first and second magnet pieces M2a and M3a or M3b and M2b may be replaced with a magnet-coupling metal piece, with its counterpart formed of a magnet.

According to embodiments of the present invention, the first and second magnet pieces M2a and M3a or M3b and M2b of the first temple part 11a or the second temple part 11b may be attached to an outer surface of the first temple part 11a or the second temple part 11b or may be invisibly embedded in the first temple part 11a or the second temple part 11b. Alternatively, the first magnet piece M2a or M3b and the second magnet piece M3a or M3b may be magnetized portions of the first temple part 11a or second temple part 11b but rather than being provided as separate members.

As shown in FIG. 3, when viewed in a side view, the temple 11 forms a streamlined shape for better wearable comfort. For example, the second temple part 11b of the temple 11 gradually tapers in a direction away from the lens rim 12 (or, x-axis direction) before the temple end. The temple end is shaped to be bent downward (or, -z-axis direction) for smoothly holding a wearer's ear.

Referring back to FIG. 2, an upper edge of the first temple part 11a is extended from an inner sidewall of the first temple part 11a in a direction substantially perpendicular to the inner sidewall of the first temple part 11a (e.g., in the -y axis direction). The first temple part 11a includes a protrusion at a rear side thereof, and the protrusion may include a magnet or magnet coupling with a metal piece as its counterpart to form a magnet and a hinge.

A groove may be formed at the upper edge of the first temple part 11a right before the protrusion so that the top surface of the bridge part may be exposed, at least partially, when the eyewear is left in the full folded position as shown in FIG. 5.

The first temple part 11a and the second temple part 11b, when folded, form an outer casing, or an enclosure to, enclose the folded lens structure as shown in FIG. 5.

Therefore, the folded lens rims 12 including the nose guard and the lenses 13 are encapsulated in the enclosure, thus effectively protecting the same.

Referring to FIG. 4, the vertical width of the folded temple 11 may be substantially the same as the vertical width of the lens rim 12, and thus, a majority portion of the lens rim 12 and the lens 13 is hidden by the folded temple 11 as viewed in a side view, with a relatively smaller portion thereof is exposed to the outside due to the streamlined and tapering shape of the temple 11.

According to exemplary embodiments of the present invention, the curvature of the temples 11 allows an eyewear to remain comfortably and securely on his/her head. The enclosure or casing formed when the first temple part 11a and the second temple part 11b of temples 11 are folded provides protection for the included nose guard, rims, and lenses.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An eyewear comprising:
a left unit; and
a right unit coupled with the left unit through a first hinge, wherein each of the left unit and the right unit includes,
a lens rim;
a temple coupled with a side of the lens rim through a second hinge, the temple having a first temple part and a second temple part coupled with each other via a third hinge, wherein the first temple part and the second temple part are shaped and sized to form an enclosure when the second temple part is folded against the first temple part, wherein the first temple part includes a groove; and
a nose guard piece extending from a side of the lens rim,
wherein the nose guard piece of the left unit and the nose guard piece of the right unit together form a nose guard when the lens rims are left unfolded,
wherein the groove of the first temple part of the left unit aligns with and receives the nose guard piece of the left unit when the eyewear is in a folded position, and the groove of the first temple part of the right unit aligns with and receives the nose guard piece of the right unit when the eyewear is in the folded position,
wherein upon further folding of the right unit against the left unit, an outer casing is formed by the temples enclosing the lens rims.

2. The eyewear of claim 1, wherein the temple forms a curvature when left unfolded.

3. The eyewear of claim 1, wherein the second temple part of the temple includes a tapering front part and a temple end connected to the tapering front part.

4. The eyewear of claim 1, wherein the nose guard is encapsulated in the enclosure when the eyewear is left in the folded position.

5. The eyewear of claim 1, further comprising a bridge connecting the lens rim of the left unit with the lens rim of the right unit, wherein the bridge includes a first bridge part extended from the lens rim of the left unit and a second bridge part extended from the lens rim of the right unit.

6. The eyewear of claim 5, wherein the first bridge part is coupled with the second bridge part via the first hinge.

7. The eyewear of claim 5, wherein the first bridge part and the second bridge part include opposite-polarity magnets, respectively.

8. The eyewear of claim 5, wherein the first hinge includes two hinges.

9. The eyewear of claim 1, wherein the first temple part of the temple includes a first magnet at a rear side thereof, and the second temple part of the temple includes a second magnet at a front side thereof, wherein the first magnet and the second magnet have opposite polarities, and wherein the first magnet is positioned to couple to the second magnet when the temple is left unfolded.

10. The eyewear of claim 1, wherein the first temple part of the temple includes a first magnet at a front side thereof, and the second temple part of the temple includes a second magnet at a rear side thereof, wherein the first magnet and the second magnet have opposite polarities, and wherein the first magnet is positioned to couple to the second magnet when the temple is left folded.

11. The eyewear of claim 1, wherein the third hinge includes two hinges.

12. The eyewear of claim 1, wherein a vertical width of the temple when the temple is left folded is substantially the same as a vertical width of the lens rim as viewed in a side view.

13. The eyewear of claim 1, wherein an entirety of the second temple part is disposed below the first temple part when the second temple part is folded against the first temple part.

14. An eyewear comprising:
a pair of lenses foldably coupled with each other via a first hinge;
a pair of temples respectively coupled with the pair of lenses via a second hinge, wherein each temple forms a curvature and is foldable through a third hinge, and wherein each of the temples is folded to form an enclosure for at least partially enclosing a corresponding one of the pair of lenses; and
a pair of lens rims respectively surrounding the pair of lenses,
wherein each lens rim includes a nose guard piece and each temple includes a groove, and the grooves align with and receive the nose guard pieces when the eyewear is in a folded position.

15. The eyewear of claim 14, further comprising a bridge between the pair of lens rims, wherein the bridge includes a magnet positioned and configured to maintain an unfolded position of the pair of lens rims.

16. The eyewear of claim 14, wherein each of the pair of temples includes a magnet positioned and configured to maintain a folded position of the pair of temples.

17. An eyewear comprising:
a left unit; and
a right unit coupled with the left unit through a first hinge, wherein each of the left unit and the right unit includes,
a lens rim; and
a temple coupled with a side of the lens rim through a second hinge, the temple having a first temple part and a second temple part coupled with each other via a third hinge,
wherein the first temple part and the second temple part are shaped and sized to form an enclosure when the second temple part is folded against the first temple part,
wherein upon further folding of the right unit against the left unit, an outer casing is formed by the temples enclosing the lens rims,
wherein an entirety of the second temple part is disposed below the first temple part when the second temple part is folded against the first temple part.

* * * * *